(12) United States Patent
Curreno

(10) Patent No.: US 6,602,005 B2
(45) Date of Patent: Aug. 5, 2003

(54) PROCESS FOR ASSEMBLING A CARRIAGE FOR DRIVING A MARKING APPARATUS ON AT LEAST ONE GUIDE MEMBER, AND CORRESPONDING MARKING APPARATUS

(75) Inventor: Marie-Christine Curreno, Rillieux (FR)

(73) Assignee: Technifor, Miribel (FR)

( * ) Notice: Subject to any disclaimer, the term of this patent is extended or adjusted under 35 U.S.C. 154(b) by 8 days.

(21) Appl. No.: 09/794,163

(22) Filed: Feb. 28, 2001

(65) Prior Publication Data

US 2001/0027728 A1 Oct. 11, 2001

(30) Foreign Application Priority Data

Mar. 1, 2000 (FR) .............................. 00 02653

(51) Int. Cl.⁷ ................................ B41J 11/22
(52) U.S. Cl. ...................... 400/354; 400/352
(58) Field of Search ................. 400/352, 353, 400/354, 354.1, 354.2, 354.3

(56) References Cited

U.S. PATENT DOCUMENTS

| 3,061,887 | A | | 11/1962 | Clarke ...................... 264/267 |
|---|---|---|---|---|
| 4,494,127 | A | * | 1/1985 | King ........................ 235/377 |
| 5,332,321 | A | * | 7/1994 | Beauchamp et al. ......... 347/37 |
| 5,399,025 | A | | 3/1995 | Higuchi et al. ............ 384/428 |
| 5,806,985 | A | | 9/1998 | Emig ........................ 384/42 |

FOREIGN PATENT DOCUMENTS

| DE | 3428680 | | 2/1986 |
|---|---|---|---|
| DE | 19600870 | | 8/1997 |
| EP | 0212697 | | 3/1987 |
| EP | 0915260 | | 5/1999 |
| JP | 63172675 A | * | 7/1988 ............ B41J/19/20 |

* cited by examiner

Primary Examiner—Daniel J. Colilla
(74) Attorney, Agent, or Firm—Dowell & Dowell, P.C.

(57) ABSTRACT

An assembly including a carriage for driving a marking apparatus on at least one guide member wherein the carriage is secured to a bearing allowing the carriage to slide on the guide member. The carriage includes at least one opening made with transverse dimensions substantially greater than those of the guide member so that when the carriage is placed in position, an intermediate space is defined between the walls of the opening and an opposite outer periphery of the guide member which space is filled with a polymerizable resin which forms a bearing sleeve between the walls of the opening and at least a part of the outer periphery of the guide member.

8 Claims, 3 Drawing Sheets

PROCESS FOR ASSEMBLING A CARRIAGE FOR DRIVING A MARKING APPARATUS ON AT LEAST ONE GUIDE MEMBER, AND CORRESPONDING MARKING APPARATUS

BACKGROUND OF THE INVENTION

1. Field of the Invention

The present invention relates to a process for assembling a carriage for driving a marking apparatus on at least one guiding member, as well as to a corresponding marking apparatus.

Within the meaning of the invention, the generic term "marking apparatus" designates any apparatus for making a mark on the surface of a piece, whether it be by printing, deformation or by removal of matter on or from this surface.

2. Description of the Related Art

As is known, a marking apparatus comprises a frame supporting a mechanism for driving a marking tool, which may in particular be a pneumatic stylus or an engraving head. This drive mechanism conventionally comprises an element fixed with respect to the frame, provided with raised edges on which two guide bars are disposed. A first drive carriage is mounted to slide on the latter and is itself provided with two additional bars, which are perpendicular to the afore-mentioned first pair of bars and are intended to receive a second drive carriage to which the marking tool is fastened.

Thanks to the use of this so-called "crossed carriage" drive mechanism, the marking tool is able to move in two directions perpendicular to each other, with respect to the frame.

The process of assembling each carriage on the guide bars which receive it consists firstly in making at least one bore in this carriage, then in arranging in each bore at least one self-lubricating bearing, for example by adhesion or by force-fit. This assembly thus constituted is then mounted to slide on the guide bars.

However, this known process of assembly presents certain drawbacks. In effect, it is accompanied by an extremely meticulous operation for positioning this carriage with respect to the self-lubricating bearing, which involves a particularly precise machining of the said bores. This process therefore involves lengthy and costly manufacture.

It is an object of the invention to overcome these drawbacks by proposing a process which, while ensuring a precise assembly of the drive carriage on its guide member, is simple and rapid to carry out and dispenses with any expensive machining operation.

SUMMARY OF THE INVENTION

To that end, it relates to a process for assembling a carriage driving a marking apparatus on at least one guide member, the carriage being secured to a bearing allowing the carriage to slide on the guide member according to the process at least one opening is made in the carriage adapted to receive the bearing and this bearing is interposed between the walls of the opening and the guide member An intermediate ring is arranged around the guide member. The at least one opening is made with transverse dimensions substantially greater than those of the intermediate ring. The carriage is placed in the precise position that it must occupy and an intermediate space is thus defined between the walls of the opening and the opposite outer periphery of the ring. The intermediate space is filled with a polymerizable resin and, by polymerization of this resin, a sleeve is formed between the walls of the opening and at least a part of the outer periphery of the intermediate ring.

The invention also relates to a process for assembly a carriage driving a marking apparatus on at least one guide member the carriage is to a bearing allowing the carriage to slide on the guide member. At least one opening is made in the carriage adapted to receive the bearing and this bearing is interposed between the walls of the opening and the guide member. The opening is made with transverse dimensions substantially greater than those of the guide member and the carriage is placed in the precise position that it must occupy and an intermediate space is thus defined between the walls of the opening and the opposite outer periphery of the guide member. The intermediate space is filled with a polymerizable resin and, by polymerization of this resin, a sleeve is formed between the walls of the opening and at least a part of the outer periphery of the guide member.

Finally, the invention relates to a marking apparatus, comprising a frame, a marking tool and at least one carriage driving the marking tool. The carriage is mounted to slide with respect to at least one guide member. The guide member is housed in a corresponding opening made in the carriage, and a bearing for slide is interposed between the guide member and the opposite walls of the corresponding opening. The bearing comprises a sleeve which is formed by a resin polymerizable in the solid state and which extends to the vicinity of the walls of the opening.

BRIEF DESCRIPTION OF THE DRAWINGS

The invention will be described hereinbelow with reference to the accompanying drawings, given solely by way of non-limiting example and in which.

DESCRIPTION OF PREFERRED EMBODIMENTS

Figure 1:
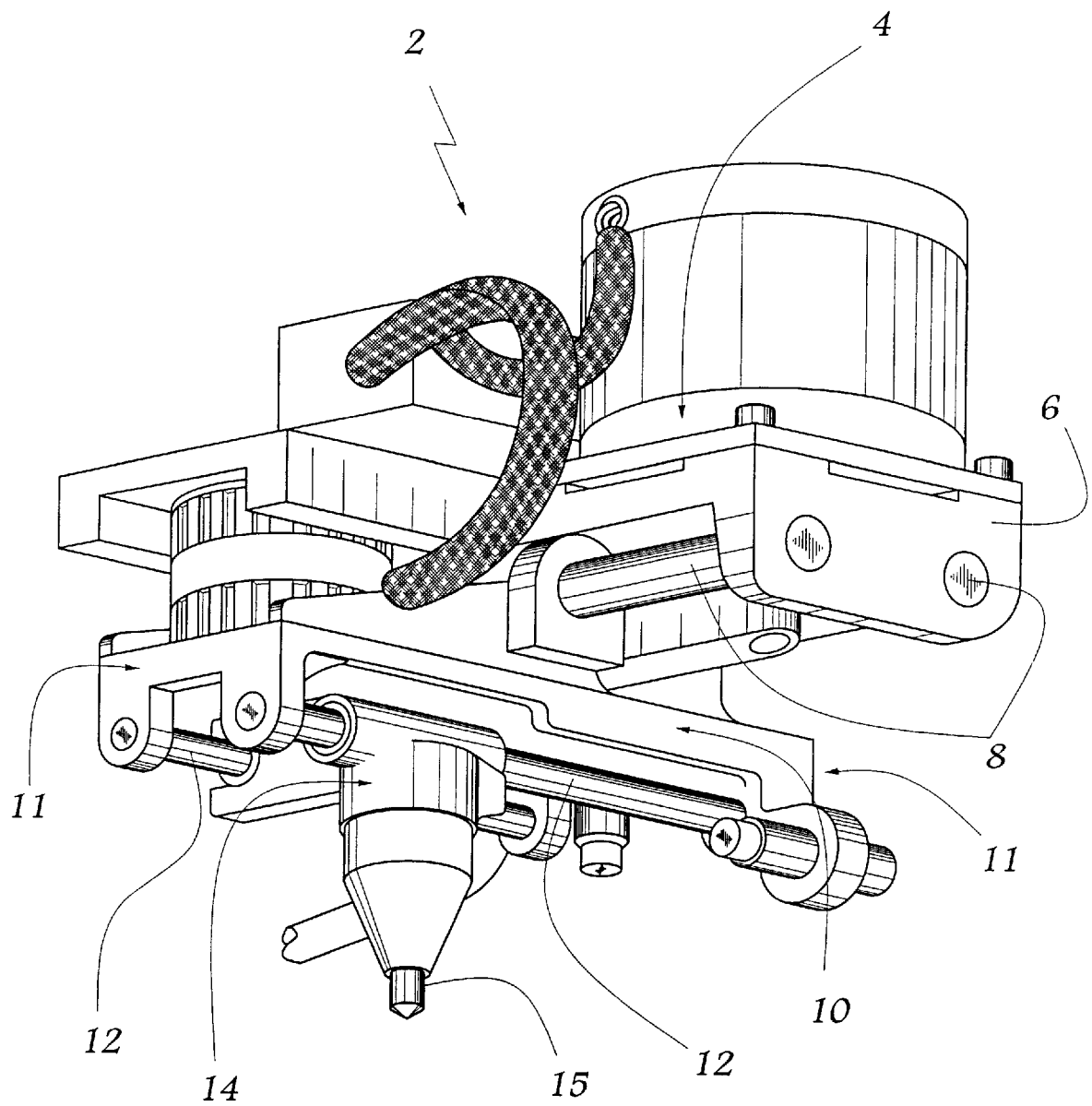
FIG. 1 is a view in perspective of a marking apparatus according to the invention.

Referring now to the drawings, the marking apparatus shown in FIG. 1 and generally designated by reference 2, comprises, in manner known per se, a fixed frame 4 comprising two opposite raised edges 6. The latter support two bars 8 which constitute guide members for the displacement of a first carriage 10 along the principal axis of these bars.

This first drive carriage 10 is provided with two opposite raised edges 11 between which extend two additional guide bars 12, the two pairs of bars 8, 12 being disposed substantially at right angles.

The bars 12 ensure guiding of a second carriage 14, on which is connected a marking tool 15, which may for example be a pneumatic stylus, or an engraving head. These two carriages 10, 14 form a mechanism for driving the marking apparatus 2, and ensure positioning of the marking tool in two directions orthogonal with respect to each other. The two carriages 10, 14 are respectively set in motion, in manner known per se, via electric motors (not shown).

Assembly of each drive carriage 10, 14 on the guide bars 8, 12 will be explained with reference to FIGS. 2 and 3. In these latter, reference will only be made to the assembly of carriage 10 on bars 8, it being understood that assembly of carriage 14 on bars 12 is similar.

Figure 2:
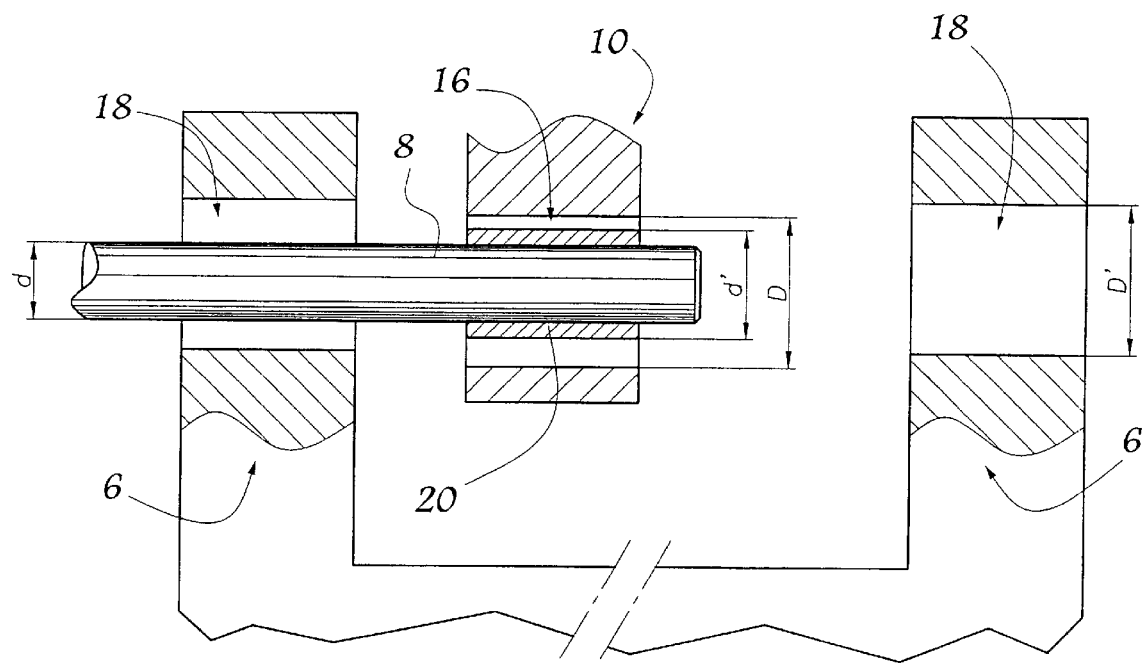
FIGS. 2 and 3 are schematic views in section, illustrating two steps of the assembly, on a guide member, of a carriage belonging to the marking apparatus of FIG. 1.
Figure 3:
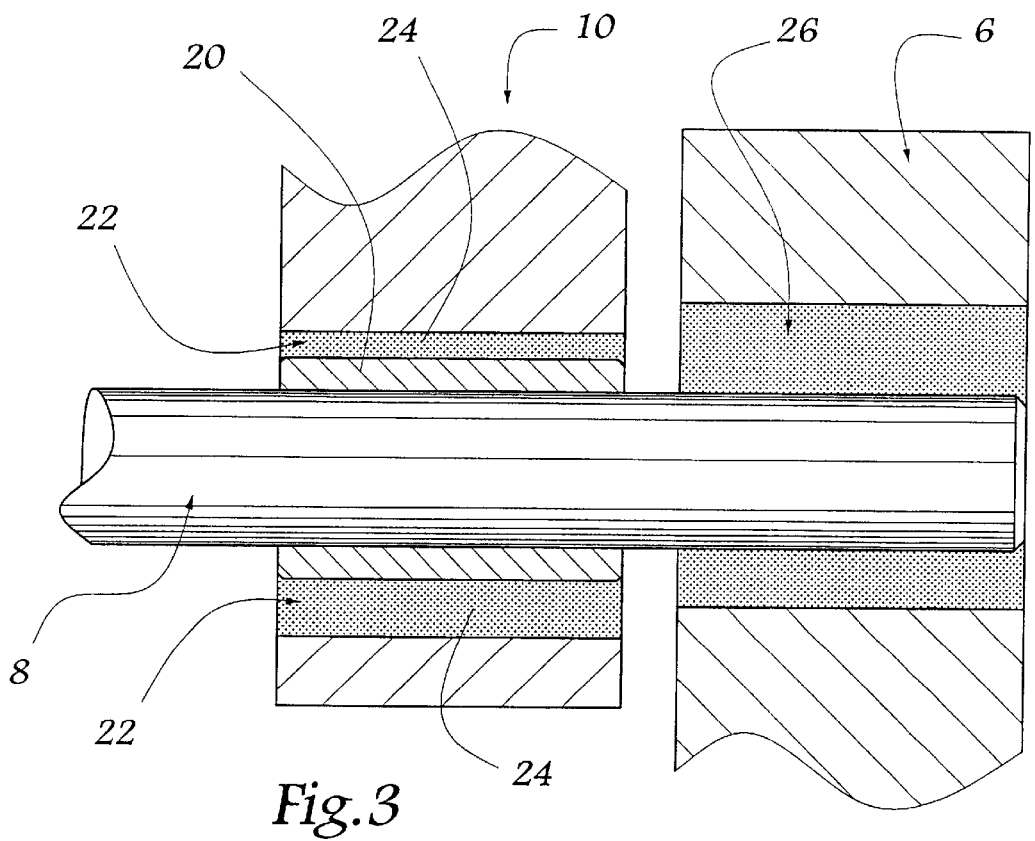

FIG. 2 partially illustrates the carriage 10, intended to be mounted on the bars 8. This carriage has two substantially cylindrical through openings made therein, of which only one, 16, has been shown. This opening presents a transverse dimension, or diameter, D.

Furthermore, through orifices 18, intended for receiving each bar 8, are made in the raised edges 6. Each orifice 18 presents a transverse dimension, or diameter D', which is substantially larger than that of the bar, namely the constant diameter d of the latter.

With a view to assembling the carriage 10 on each bar 8, one of the ends of the latter should firstly be passed through the orifices 18, then this bar axially moved, so that its second end is placed between the two raised edges 6, as shown in FIG. 2. Two rings, of which only one, 20, is shown, are then arranged around each bar, from the afore-mentioned second end. These rings, which are of conventional type, are for example made of bronze and are self-lubricating. d' denotes their outside diameter, or outer transverse dimension.

Once the two rings 20 are disposed around the bar 8, the carriage 10 is arranged, from the second end of this bar, with the result that these rings 20 are received inside the opening 16. The opening 16 is made so that its diameter D is greater than that d' of the rings 20.

Each bar 8 is then displaced axially again, with the result that its two ends are received in the orifices 18 of each raised edge 6. These ends are then positioned in accordance with the conformation that the marking device must present, once produced. To that end, the bar 8 is maintained with respect to a reference surface of the frame 4, in appropriate orientations, in accordance with the teaching of EP-A-0 915 260.

Once the bars 8 are immobilized with respect to the raised edges 6, the carriage 10 is positioned with respect to each bar 8, in the precise arrangement that it must occupy, once connected to these bars 8. Being given that the diameter D of the opening 16 is larger than that, d', of the rings 20, the outer periphery of these latter defines, with the opposite walls of the opening 16, a substantially annular intermediate space 22 (FIG. 3).

While maintaining the bars 8 and the carriage 10 in their relative positions mentioned hereinabove, each intermediate space 22 is filled with a polymerizable resin, for example a polyurethane or epoxy resin. Other types of equivalent hardenable materials may also be used.

Similarly, a certain quantity of this resin is poured into the intermediate spaces defined between the outer periphery of the ends of the bar 8 and the opposite walls of the orifices 18.

This resin is then polymerized, in manner known per se. Once this polymerization is finished, the solidified resin filling the space 22 forms a sleeve 24 separating the opposite walls of the rings 20 and of the carriage 10. Furthermore, two additional sleeves 26 are made between the opposite walls of the bar 8 and of the raised edges 6.

In this way, the carriage 10 is perfectly connected to the rings 20, with the result that this carriage 10 is adapted to slide on the bar 8, in an orientation corresponding to the desired arrangement of the marking apparatus. This sleeve 24 thus forms, with the rings 20, a bearing of the carriage 10.

Figure 4:
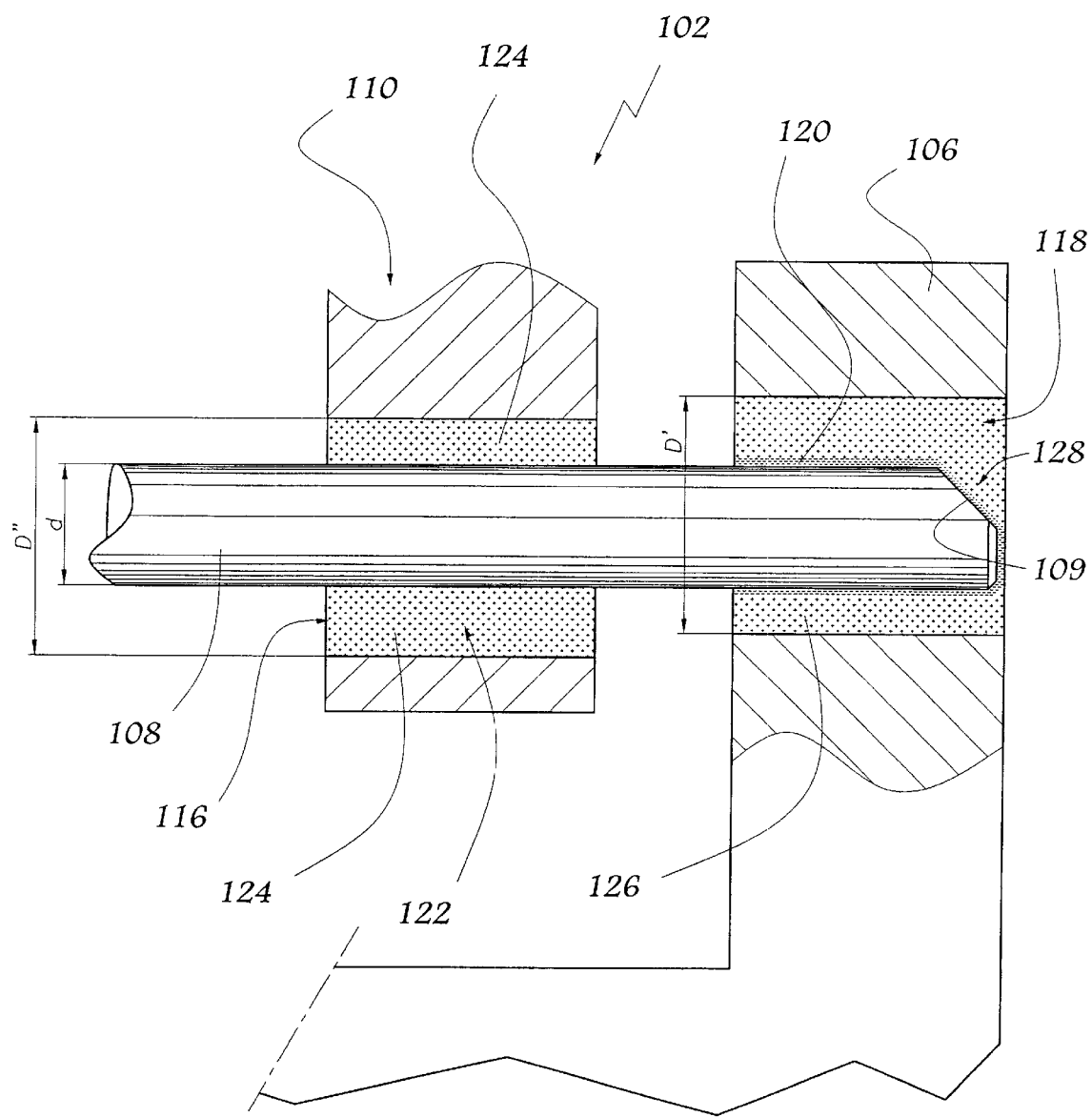
FIG. 4 is a view similar to FIG. 3, illustrating a variant embodiment of the invention.

FIG. 4 illustrates a variant embodiment of the invention. In this Figure, the mechanical elements similar to those of FIGS. 1 to 3 are given the same reference numerals, increased by 100.

The bar 108 of the marking apparatus 102 presents a constant diameter d and is provided with two end chamfers 109. Furthermore, the carriage 110 has two substantially cylindrical through openings made therein, of which only one, 116, has been shown. These openings present an inner diameter D" which, while being substantially larger than that, d, of the bar 108, is smaller than the diameter D of the openings 16 of the preceding Figures.

With a view to assembling the carriage 110 on the bars 108, an anti-adhesive coating, namely a film 120 of an anti-adhesive varnish, is applied on the end of the guide bars 108, then these latter are passed through the orifices 118, as in the example described with reference to FIGS. 1 to 3. The carriage 110 is then arranged around each bar 108 so that the latter are housed in the openings 116. It should be noted that this embodiment does not employ rings, such as those, 20, of FIGS. 1 to 3.

The bars 108 are then made to slide axially so that their ends penetrate in the orifices 118. The ends of the bars 108 are then positioned precisely with respect to the raised edges 106, and the carriage 110 with respect to each bar 108, similarly to what was described hereinabove.

A polymerizable resin is then poured into each space 122, defined by the opposite walls of each opening 116 and of each bar 108, so as to form sleeves 124. A certain quantity of this resin is also interposed between the opposite faces of the bar 108 and of the orifices 118 made in the raised edges 106. This resin may be similar to that mentioned in the example of FIGS. 1 to 3. It may also contain additives so as to present a reduced coefficient of friction. The bar 108 assembly may also be coated with the anti-adhesive film 120.

The assembly of the carriage 110 with respect to the bar 108 in a precise arrangement is thus obtained, the slide of this carriage 110 with respect to these bars 108 being allowed thanks to the resin sleeve 124 which thus constitutes a bearing of the carriage 110.

Furthermore, although the ends of the bar 108 are coated with an anti-adhesive varnish, this bar is perfectly immobilized axially with respect to the raised edges 106, since these ends come into abutment against pockets 128 of the sleeves 126, these pockets 128 extending to the vicinity of the chamfers 109.

If it is desired to dismantle the bar 108, for example with a view to repairing it, one of the pockets 128 is broken, as described in EP-A-0 915 260, with the result that the corresponding end of the bar 108 is then free to slide axially with respect to the corresponding sleeve 126, due to the presence of the anti-adhesive varnish 120.

The invention is not limited to the embodiments described and shown. In effect, it may be provided to arrange a screw on the outer wall of at least one of the raised edges 6, 106, or to surround at least one of the ends of the bars 8, 108 by means of a ring, these two possibilities being in accordance with the teaching of EP-A-0 915 260. It is also possible to fix the ends of each bar 8, 108 with respect to the corresponding raised edges 6, 106, without employing a polymerizable resin.

The invention makes it possible to attain the objects mentioned hereinbefore.

In effect, being given that each opening 6, 116 is made with transverse dimensions clearly larger than those of the rings 20 or of the bar 108 coated with the anti-adhesive varnish 120, the corresponding machining does not require any particular precision. This therefore ensures an assembly which is notably quicker and less expensive than in the prior art.

The phase of relative positioning of the carriage with respect to the bar may be carried out thanks to simple mechanical means and therefore does not involve considerable efforts likely to alter the geometry of the marking apparatus assembly once produced.

To interpose the resin sleeve directly between the carriage and the guide member is advantageous, since this makes it possible to dispense with the use of an intermediate ring. Consequently, for a given bar diameter, it is possible to produce a carriage whose dimensions are reduced, which involves a corresponding decrease in the mass of this carriage. This constitutes an appreciable advantage, particularly in terms of rapidity of displacement of the carriage, and in terms of energy costs inherent in its displacement.

What is claimed is:

1. Process for assembling a carriage driving a marking apparatus on at least one guide member, said carriage being secured to a bearing including a ring allowing the carriage to slide on said at least one guide member, the process including making at least one opening in said carriage adapted to receive said bearing such that said bearing is interposed between a wall defining the opening and said at least one guide member, forming said bearing by placing an intermediate ring around said at least one guide member, the opening having a transverse dimension substantially greater than a transverse dimension of said intermediate ring, placing said carriage in a position such that an intermediate space is defined between said wall of the opening and an opposite outer periphery of said ring, filling the intermediate space with a polymerizable resin and, polymerizing the resin to form said bearing to include a sleeve between said wall of the opening and at least a portion of the opposite outer periphery of said intermediate ring.

2. Process for assembling a carriage driving a marking apparatus on at least one guide member, said carriage being secured to a bearing allowing the carriage to slide on said at least one guide member, the process including making at least one opening in said carriage adapted to receive said bearing such that said bearing is interposed between a wall defining the opening and said at least one guide member, wherein the opening is made with transverse dimensions substantially greater than a transverse dimension of said at least one guide member, placing said carriage in a position such that an intermediate space is defined between said wall of the opening and opposite outer periphery of said at least one guide member, and, filling the intermediate space with a polymerizable resin and polymerizing the resin to form said bearing in a form of a sleeve between the wall of the opening and at least a portion of the opposite outer periphery of said at least one guide member.

3. The process of claim 2, including forming said sleeve so as to extend against the wall of the opening.

4. The process of claim 3, including forming said sleeve to extend against said at least a portion of the opposite outer periphery of said at least one guide member.

5. The process of claim 2, including forming said sleeve to extend between the wall of the opening and a slide ring forming a part of said bearing and said ring being slidably arranged around said at least one guide member.

6. The process of claim 2, wherein said at least one guide member includes opposite outer ends housed in spaced orifices made in a support, the process further including forming each of said orifices so as to have transverse dimensions substantially greater than transverse dimensions of said ends of said at least one guide member, and forming second bearing sleeves between an outer periphery of each of said ends and opposite walls defining each of said spaced orifices by introducing a polymerizable resin between the outer periphery of each of said ends and said opposite walls of said spaced orifices and polymerizing the introduced resin in situ.

7. The process of claim 6, including forming each of said bearing sleeves so that said at least one guide member is slidable axially with respect to each of said second bearing sleeves, and axially immobilizing each of said outer ends with respect to said support.

8. The process of claim 6, including providing an anti-adhesive coating between said outer ends of said at least guide member and said spaced orifices prior to polymerizing the resin in situ therebetween.

* * * * *